US008665690B1

(12) United States Patent
Moravec et al.

(10) Patent No.: US 8,665,690 B1
(45) Date of Patent: Mar. 4, 2014

(54) SYSTEM FOR PROVIDING AN ENERGY ASSISTED MAGNETIC RECORDING HEAD HAVING A LEADING FACE-MOUNTED LASER (71) Applicant: Western Digital (Fremont), LLC, Fremont, CA (US)

(72) Inventors: Mark D. Moravec, Lamlukka (TH); Suwanchai Kongdum, Ayuthaya (TH); Kittikom Nontprasat, Klongluang (TH)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/858,280

(22) Filed: Apr. 8, 2013

Related U.S. Application Data (62) Division of application No. 12/645,500, filed on Dec. 23, 2009, now Pat. No. 8,418,353.

(51) Int. Cl.
*G11B 11/00* (2006.01)
(52) U.S. Cl.
USPC .................. 369/300; 369/13.33; 369/13.24
(58) Field of Classification Search
USPC .............. 369/13.01, 13.13, 13.33, 300, 13.24
See application file for complete search history.

(56) References Cited

U.S. PATENT DOCUMENTS

| | | | | |
|---|---|---|---|---|
| 4,911,512 A * | 3/1990 | Yamamoto et al. | ............ | 385/14 |
| 5,497,359 A * | 3/1996 | Mamin et al. | ............ | 369/44.15 |
| 6,075,673 A * | 6/2000 | Wilde et al. | ............ | 369/300 |
| 6,775,100 B1 * | 8/2004 | Belser et al. | ............ | 360/137 |
| 7,483,229 B2 * | 1/2009 | Rausch et al. | ............ | 360/59 |
| 7,755,978 B2 * | 7/2010 | Nishida et al. | ............ | 369/13.13 |
| 7,921,436 B2 * | 4/2011 | Shimizu et al. | ............ | 720/659 |
| 7,966,630 B2 * | 6/2011 | Hirata et al. | ............ | 720/659 |
| 8,012,804 B1 | 9/2011 | Wang et al. | | |
| 8,023,225 B2 * | 9/2011 | Shimazawa et al. | ....... | 360/125.4 |
| 8,024,748 B1 | 9/2011 | Moravec et al. | | |
| 8,116,171 B1 * | 2/2012 | Lee | ............ | 369/13.01 |
| 8,116,176 B2 * | 2/2012 | Kato et al. | ............ | 369/13.33 |
| 8,134,794 B1 | 3/2012 | Wang | | |
| 8,144,549 B2 * | 3/2012 | Furukawa et al. | ......... | 369/13.24 |
| 8,164,855 B1 * | 4/2012 | Gibbons et al. | ......... | 360/125.74 |
| 8,218,405 B2 * | 7/2012 | Kurita et al. | ............ | 369/13.24 |
| 8,279,719 B1 * | 10/2012 | Hu et al. | ............ | 369/13.01 |
| 8,345,519 B1 * | 1/2013 | Pan | ............ | 369/13.33 |
| 8,379,495 B2 * | 2/2013 | Boone et al. | ............ | 369/13.24 |

(Continued)

OTHER PUBLICATIONS

Office Action dated May 15, 2012 in U.S. Appl. No. 12/645,500 7 pages.

(Continued)

*Primary Examiner* — Brian Miller (57) ABSTRACT

A system for providing energy assisted magnetic recording (EAMR) heads using a substrate is described. The substrate has front and back sides and apertures therein. The apertures are through-holes between the front and back sides of the substrate. The system includes providing a transmission medium in the apertures and fabricating EAMR transducers on the front side of the substrate. The EAMR transducers correspond to the apertures and the EAMR heads. The system also includes electrically insulating the back side of the substrate. The back side of the substrate is also prepared for mounting of the lasers. The lasers then are coupled the back side of the substrate. The lasers correspond to the EAMR heads and are configured to provide light through the apertures to the EAMR transducers. The system also includes separating the substrate into the EAMR heads.

6 Claims, 10 Drawing Sheets

(56) References Cited

U.S. PATENT DOCUMENTS

| | | | |
|---|---|---|---|
| 8,391,109 B2* | 3/2013 | Araki et al. | 369/13.33 |
| 8,411,391 B2* | 4/2013 | Hirata et al. | 360/244.1 |
| 8,418,353 B1* | 4/2013 | Moravec et al. | 29/603.16 |
| 8,422,342 B1* | 4/2013 | Lee | 369/13.33 |
| 8,456,963 B1* | 6/2013 | Hu et al. | 369/13.33 |
| 2002/0001283 A1* | 1/2002 | Niwa et al. | 369/112.27 |
| 2005/0190496 A1* | 9/2005 | Hamann et al. | 360/128 |
| 2005/0190682 A1* | 9/2005 | Gage et al. | 369/112.29 |
| 2007/0165495 A1* | 7/2007 | Lee et al. | 369/13.33 |
| 2007/0230047 A1* | 10/2007 | Jin et al. | 360/126 |
| 2008/0049563 A1* | 2/2008 | Konno et al. | 369/13.24 |
| 2008/0117727 A1* | 5/2008 | Matsumoto | 369/44.14 |
| 2008/0123219 A1* | 5/2008 | Gomez et al. | 360/234.5 |
| 2011/0013497 A1* | 1/2011 | Sasaki et al. | 369/13.24 |
| 2011/0090770 A1* | 4/2011 | Iwanabe et al. | 369/13.24 |
| 2011/0141862 A1* | 6/2011 | Arai et al. | 369/13.33 |
| 2011/0188356 A1* | 8/2011 | Hirata et al. | 369/13.33 |
| 2011/0205865 A1* | 8/2011 | Matsushima et al. | 369/13.33 |

OTHER PUBLICATIONS

Office Action dated Aug. 29, 2012 in U.S. Appl. No. 12/645,500 5 pages.

Notice of Allowance dated Dec. 31, 2012 in U.S. Appl. No. 12/645,500 5 pages.

* cited by examiner

Front/Back View

Side View

Back View

Side View

FIG. 11

SYSTEM FOR PROVIDING AN ENERGY ASSISTED MAGNETIC RECORDING HEAD HAVING A LEADING FACE-MOUNTED LASER

CROSS REFERENCE TO RELATED APPLICATIONS

This application is a divisional of U.S. patent application Ser. No. 12/645,500, filed on Dec. 23, 2009, now U.S. Pat. No. 8,418,353 granted Apr. 16, 2013, which is hereby incorporated by reference in its entirety.

BACKGROUND

Figure 1:
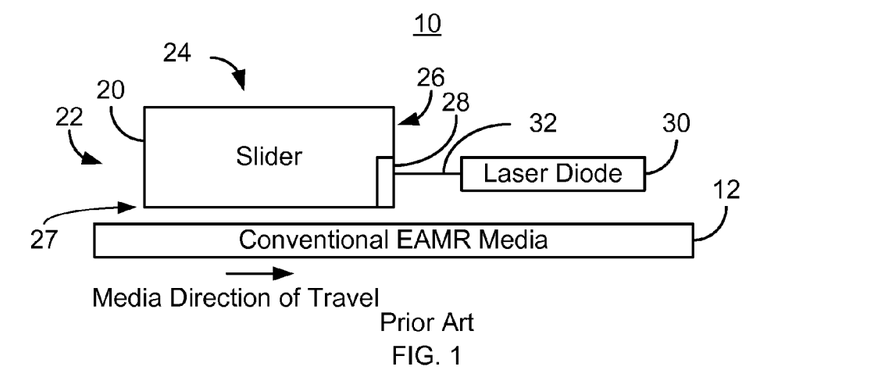
FIG. 1 is a diagram depicting a portion of a conventional energy assisted magnetic recording disk drive.

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown) or to the back side 24 of the slider 20. The conventional slider 20 has a leading face 22, a trailing face 26, a back side 24, and an air-bearing surface (ABS) face 25. The leading face 22 and trailing face 26 are so termed because of the direction the conventional media 12 travels with respect to the EAMR transducer 28. Other components that may be part of the conventional EAMR disk drive 10 are not shown. The conventional slider 20 is typically attached to the suspension at its back side 24. A conventional EAMR transducer 22 is coupled with the slider 20. Although shown as physically separated from the slider 20, the laser diode 30 may be mounted closer to or in contact with the trailing face 26 of the slider 20.

Light from the conventional laser diode 30 is provided substantially along the optic axis 32 of the conventional laser diode 30 to the trailing face 26 of the slider 20. More specifically, light from the laser diode 30 is provided to a grating (not shown) of conventional EAMR transducer 22. The light from the laser diode 30 coupled into the grating is then provided to a waveguide (not shown). The waveguide directs the light toward the conventional media 12, heating a small region of the conventional EAMR media 12. The conventional EAMR transducer 22 magnetically writes to the conventional EAMR media 12 in the region the conventional EAMR media 12 is heated.

Figure 2:
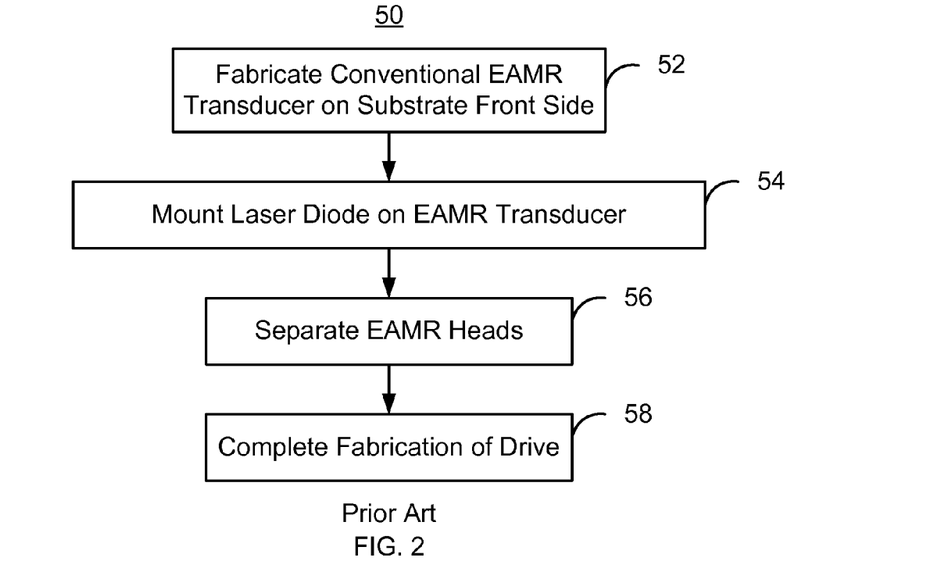
FIG. 2 is a flow chart depicting a conventional method for fabricating a conventional EAMR disk drive.

FIG. 2 depicts a conventional method 50 for fabricating a portion of the conventional EAMR disk drive 10. For simplicity, only a portion of the method 50 is described. The EAMR conventional MR transducer 28 is fabricated on the front side of a conventional substrate, such as an AlTiC substrate, via step 52. Typically, a reader for the conventional disk drive 10 has already been fabricated. Thus, the conventional EAMR transducer 28 is built on top of other structures. Typically, multiple transducers are fabricated in parallel on the same substrate.

Once fabrication of the conventional EAMR transducer 28 is completed, the laser diode 30 may be mounted in proximity to the conventional EAMR transducer 28, via step 54. More specifically, the laser diode 30 may be mounted in proximity to the trailing surface 26 or the back side 24 of the slider 20. Step 54 may typically include individually aligning and placing each laser diode 30 with respect to the EAMR transducer 28, then affixing the laser 30 to the front side of the substrate on which the EAMR transducer 28 is fabricated. The EAMR heads may then be separated, via step 56. For example, the substrate holding the EAMR transducers 28 may be diced or otherwise cut into individual sliders 20. The front side of the substrate, on which the EAMR transducer 28 is fabricated, becomes the trailing face 26 of the slider 20. In other methods, the EAMR heads are separated prior to the laser diode 30 being mounted. However, in both cases, the laser diode is mounted in proximity to the trailing face 26 and, therefore, in proximity to the EAMR transducer 28. The fabrication of the conventional drive 10 may then be completed. For example, the conventional EAMR head including the conventional slider 20 and conventional EAMR transducer 28 may be mounted on a suspension and then in a disk drive.

Although the conventional EAMR disk drive 10 and method 50 may function, improvements are desired. More specifically, improved methods of fabricating the conventional EAMR disk drive 10, including coupling the laser with the EAMR transducer 28 and assembling the slider 20, the laser 30, and the suspension (not shown) are desired.

Accordingly, what is needed is a system and method for improving manufacturability and performance of an EAMR transducer.

BRIEF SUMMARY OF THE INVENTION

A method and system for providing a plurality of energy assisted magnetic recording (EAMR) heads using a substrate are described. The substrate has a front side, a back side, and a plurality of apertures therein. The apertures are through-holes between the front side and the back side of the substrate. The method and system include providing a transmission medium in the apertures. The method and system also include fabricating the EAMR transducers on the front side of the substrate. The EAMR transducers correspond to the apertures and the EAMR heads. The method and system also include electrically insulating the back side of the substrate. The back side of the substrate is also prepared for mounting of the lasers. The lasers are coupled to the back side of the substrate. The lasers correspond to the plurality of EAMR heads and are configured to provide light through the apertures to the EAMR transducers. The method and system also include separating the substrate into the plurality of EAMR heads.

DETAILED DESCRIPTION OF EMBODIMENTS OF THE INVENTION

Figure 3:
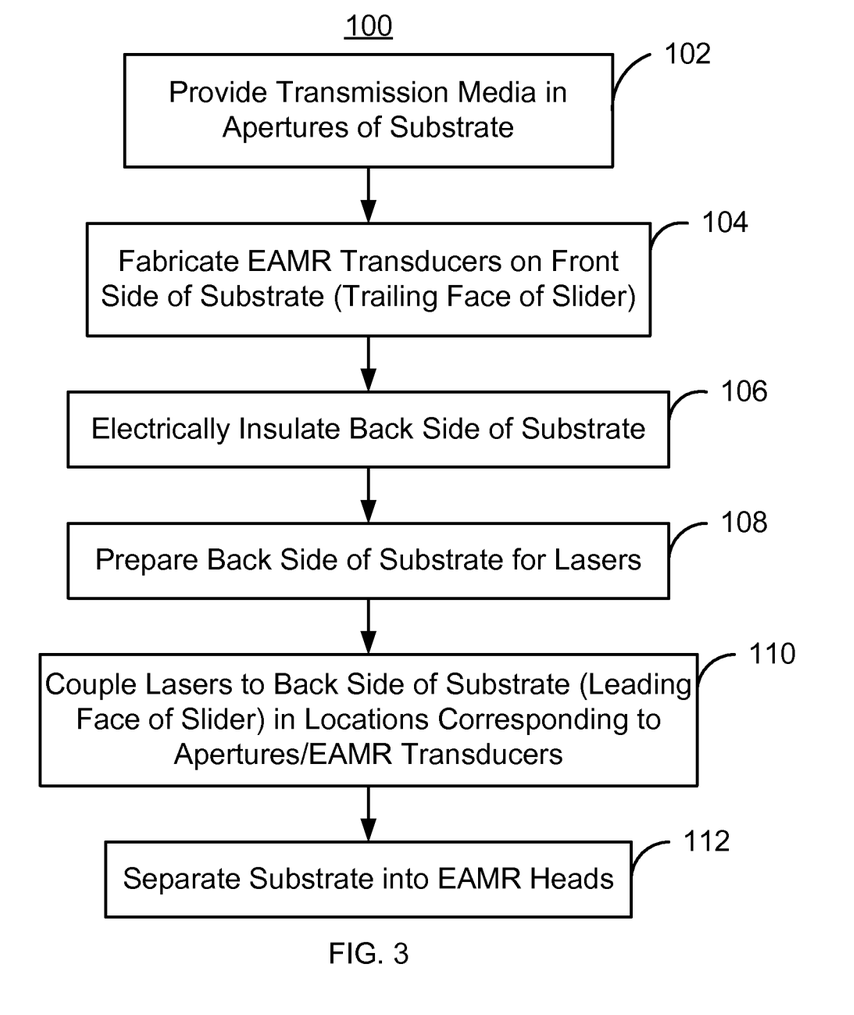
FIG. 3 is a flow chart depicting an exemplary embodiment of a method for fabricating an EAMR head.

FIG. 3 is a flow chart depicting an exemplary embodiment of a method 100 for fabricating EAMR heads. Although certain steps are shown, some steps may be omitted, interleaved, performed in another order, and/or combined. The EAMR heads being fabricated may be part of merged heads, each of which includes an EAMR write transducer, a read transducer (not shown) and resides on a slider.

The method 100 utilizes a substrate that has a front side, a back side, and a plurality of apertures therein. The apertures are through-holes between the front and back sides. Such a substrate may be formed by laser drilling through-holes in a substrate, such as an AlTiC substrate or in another manner. In some embodiments, each aperture has a diameter of at least twelve microns and not more than five hundred microns. In some such embodiments, each aperture is at least forty-five microns and not more than one hundred microns.

A transmission medium is provided in the apertures, via step 102. In some embodiments, step 102. The transmission medium allows for transmission of optical energy ("light") through the apertures. In some embodiments, light in the 300 nm to 1500 nm range of the spectrum is used. However, light in other embodiments, light outside this range of the spectrum may be used. For example, the transmission medium could include one or more of an index-matching material, a waveguide compatible material, and a gas. Examples of index-matching material include boron phosphate silicon glass (BPSG), tantalum oxide, alumina, a silica gel, or other transparent materials. Waveguide compatible materials may include materials such as Au. The gas may include ambient air and/or He. Alternatively, the transmission media could include vacuum.

EAMR transducers are fabricated on the front side of the substrate, via step 104. Step 104 includes forming the EAMR transducers in locations corresponding to the plurality of apertures. The EAMR transducers are part of the EAMR heads being formed. Thus, gratings, waveguides, NFTs, poles, coils, and other portions of the EAMR transducers may be formed in step 104. Fabrication of the EAMR transducers may include providing an optical system to redirect light from the apertures to the EAMR transducers. For example, a mirror directed at the appropriate angle to couple light from the aperture to a grating or waveguide may be provided in step 104. In some embodiments, the mirror may be a parabolic mirror. Step 104 may also include fabricating read transducers.

The back side of the substrate is electrically insulated, via step 106. In some embodiments, step 106 includes depositing an insulating layer on the back side of the substrate. For example, a layer of alumina may be deposited on the back side of the substrate. The layer would have a thickness sufficient to provide the desired electrical insulation.

The back side of the substrate is prepared for a plurality of lasers, via step 108. Step 108 includes forming contacts for the lasers after the insulating layer has been formed in step 106. In some embodiments, step 108 may include grinding the back side to thin the substrate prior to deposition of the insulating layer. The back side may also be polished after the substrate is ground and before the insulating layer is provided.

The lasers are coupled to the back side of the substrate, via step 110. The lasers correspond to the EAMR transducers formed in step 108, and thus to the EAMR heads being fabricated. The lasers are also configured to provide light to the EAMR transducers through the apertures. Step 110 thus includes aligning the lasers to their desired positions, then mechanically and electrically connecting the lasers. In some embodiments, multiple lasers are aligned at one time. For example, laser diode strips containing multiple laser diodes may aligned and coupled in step 110. In some embodiments, the alignment performed in step 110 is passive. Thus, the laser(s)/laser diode strips are aligned based on alignment marks. In other embodiments, the laser(s)/laser diode strips may be actively aligned. For example, light from one or more lasers in the laser diode strips may be shined through aperture (s) for which no EAMR transducer is fabricated on the front side. The signal from the laser diode strips may be read on the opposing side of the apertures. When this signal is at or near a maximum, the laser diode strip, and thus the lasers within the strip, are aligned. In some embodiments, a combination of passive and active alignment may be used. In some embodiments, mechanically and electrically connecting the lasers may be accomplished via soldering. For example, the laser(s) or laser diode strips may include pre-formed solder spot(s). The laser diode strips, once aligned and in place, may be locally heated. Thus, the solder spots melt, electrically and mechanically coupling the lasers to the substrate back. Step 110 may also include providing heat sinks for the lasers.

The substrate is separated into the EAMR heads, via step 112. Thus, individual EAMR heads may be fabricated. Once completed, the EAMR heads may be coupled to a suspension or otherwise mounted in a disk drive.

Figure 4:
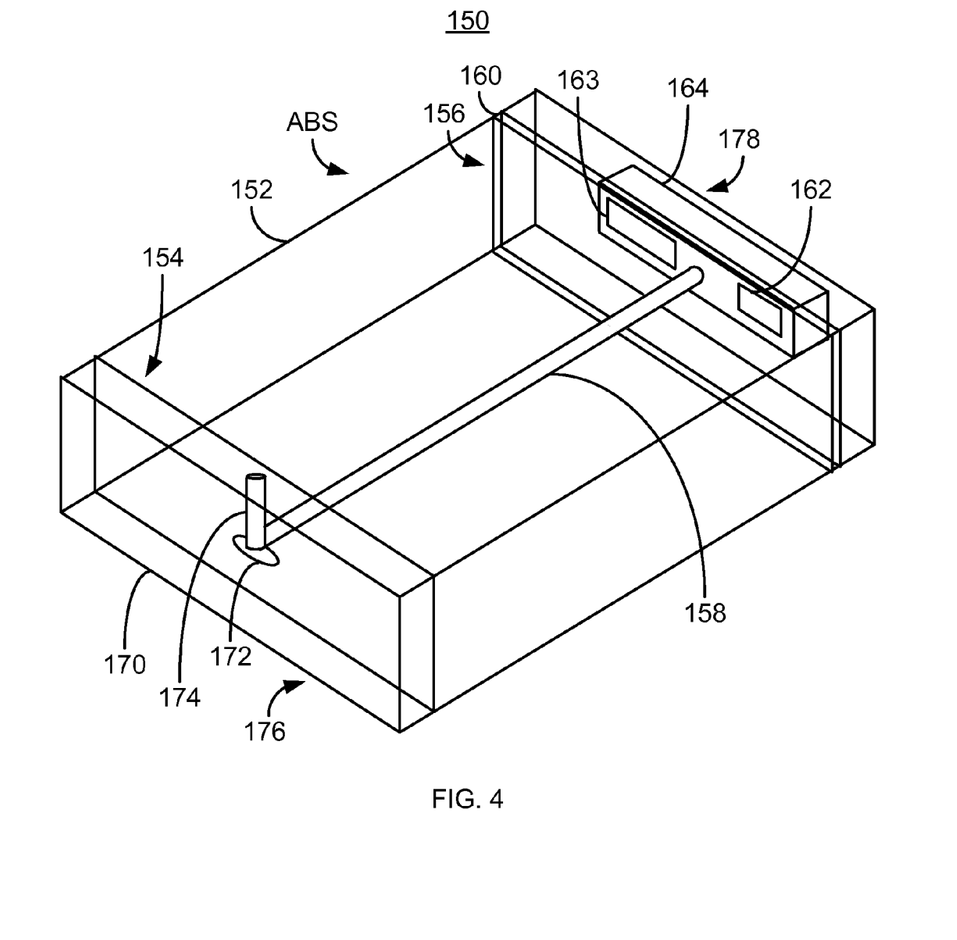
FIG. 4 is a diagram depicting an exemplary embodiment of an EAMR head.

FIG. 4 is a diagram depicting an exemplary embodiment of an EAMR head 150 fabricated using the method 100. The EAMR head 150 includes a slider 152 which is part of the substrate (not shown). The EAMR head 150 includes a trailing face 176 and a leading face 178. The trailing face 176 corresponds to the front side 154 of the substrate, while the leading face 178 corresponds to the back side 156 of the substrate. The slider 152 also includes aperture 158 that is between the back side 156 and the front side 154. The aperture 158 is filled with a transmission media (not separately shown in FIG. 4). On the back side 156, an insulating layer 160 has been provided. Further, a contact 162 and heat sink 163 have been provided to the laser 164. In some embodiments, the laser 164 is a surface emitting laser diode. Alternatively, the laser 164 may be an edge emitting laser. In such an embodiment, an additional optical system (not shown in FIG. 4) may be provided between the laser 164 and the aperture 158 to redirect light from the edge emitting laser 164 to the aperture 158. On the front side 154, an EAMR transducer 170 has been formed. The EAMR transducer 170 includes an optical system 172 used to redirect light from the aperture 158 to the waveguide 174. In some embodiments, the optical system 172 is a parabolic mirror.

In operation, the laser 164 emits light to the aperture 158. Light is transmitted by the aperture 158 from the leading face 178/back side 156 to the trailing face 176/front side 154. The light is redirected by the optical system 172 to the waveguide 174. The waveguide 174 directs light to the air-bearing surface ABS. In some embodiments, a near-field transducer (NFT) may also be included in the EAMR transducer 170. In such embodiments, the NFT is used to develop a spot on the media (not shown). The EAMR transducer 170 magnetically writes to the media using pole(s) (not shown), coil(s) (not shown) and other components.

Using the method 100, the EAMR head 150 may be fabricated. Because the laser 164 may be provided at the back side 156/leading face 178, more real estate on the trailing face 176 is available. Thus, contacts and other electronics (not shown) for the EAMR transducer 170 may more easily be provided. Further, a heat sink 163 may be provided for improved thermal management. Finally, active alignment may be performed using the aperture 158. Thus, alignment is improved. Further, wafer-level processing technology may be used for preparing the back side of the substrate for the lasers. This may reduce cost and improve throughput. Consequently, manufacturability and performance of the EAMR head 150 may be improved.

Figure 5:
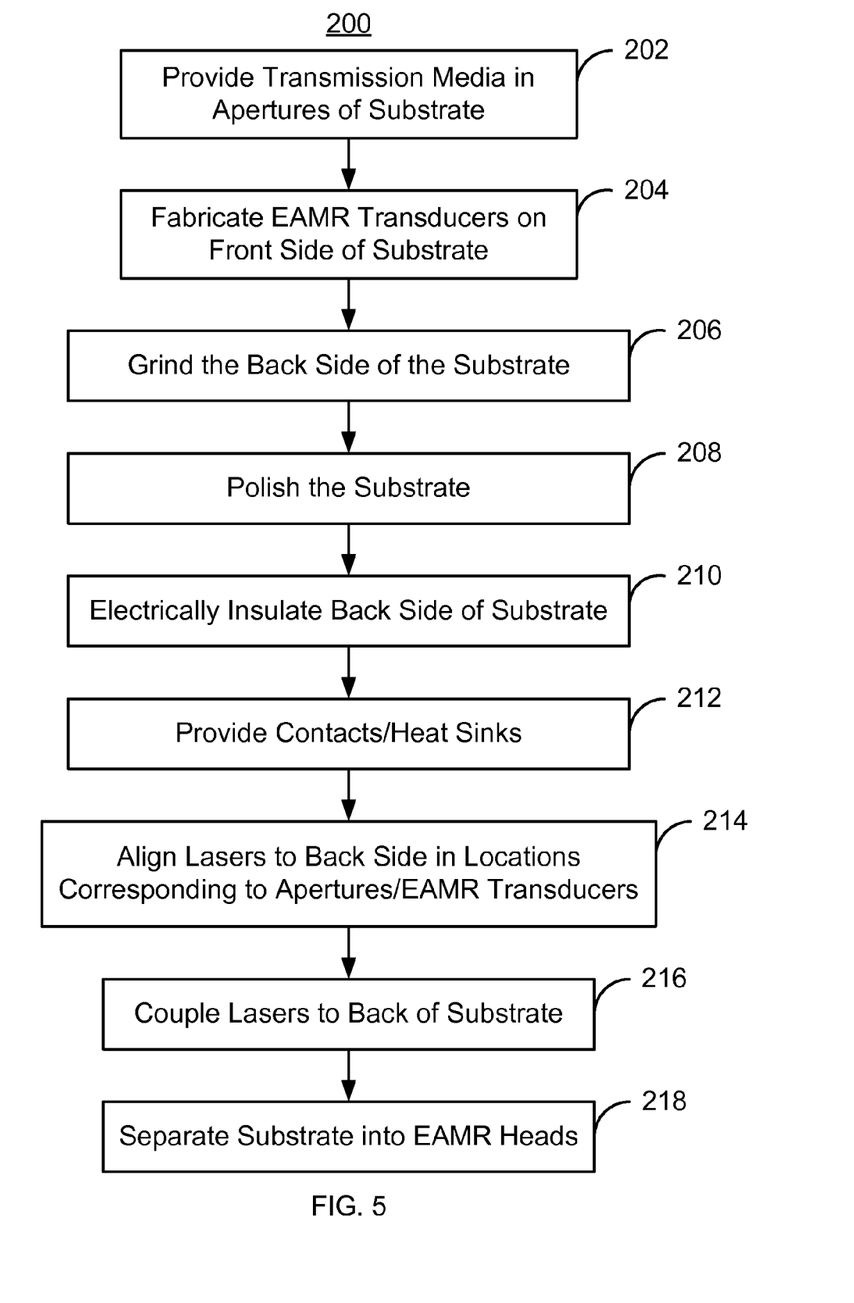
FIG. 5 is a flow chart depicting another exemplary embodiment of a method for fabricating an EAMR head.

FIG. 5 is a flow chart depicting another exemplary embodiment of a method 200 for fabricating an EAMR head. FIGS. 6-11 are diagrams depicting EAMR heads 250 during fabrication. For clarity, FIGS. 6-11 are not to scale. Further, for simplicity, not all components are labeled in FIGS. 6-11. For example, only some of the apertures, transducers, contacts, heat sinks, lasers, and laser bars are labeled. Referring to FIGS. 5-11, the method 200 is described in the context of the substrate, EAMR transducers, and other components shown. However, the method 200 may be used to form another device (not shown). The EAMR heads 250 being fabricated may be part of a merged head that also includes a read head (not shown in FIG. 6-11) and resides on a slider of a disk drive.

Figure 6:
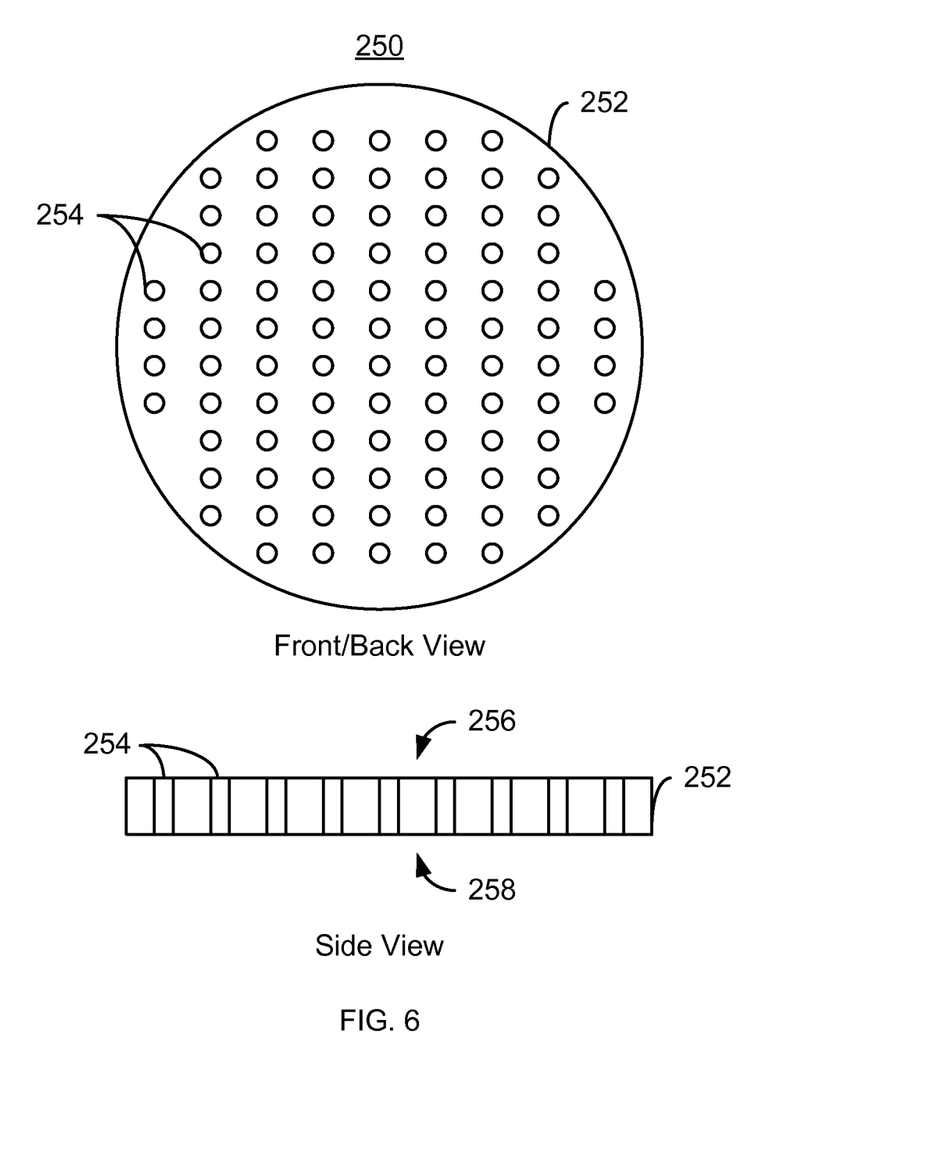
FIGS. 6-11 are diagrams depicting an exemplary embodiment of an EAMR head during fabrication.

FIG. 6 depicts the substrate 252 prior to the method 200 commencing. Thus, the substrate 252 is shown with apertures 254 therein. The substrate 252 also has a front side 256 and a back side 258. The apertures 254 may be provided by laser drilling through the substrate 252 or in another manner. The apertures 254 may be least twelve microns and not more than five hundred microns. In some such embodiments, each aperture 254 is at least forty-five microns and not more than one hundred microns. Although a particular number of apertures 254 are shown, another number of apertures 254 may be provided in any given substrate 252.

Figure 7:
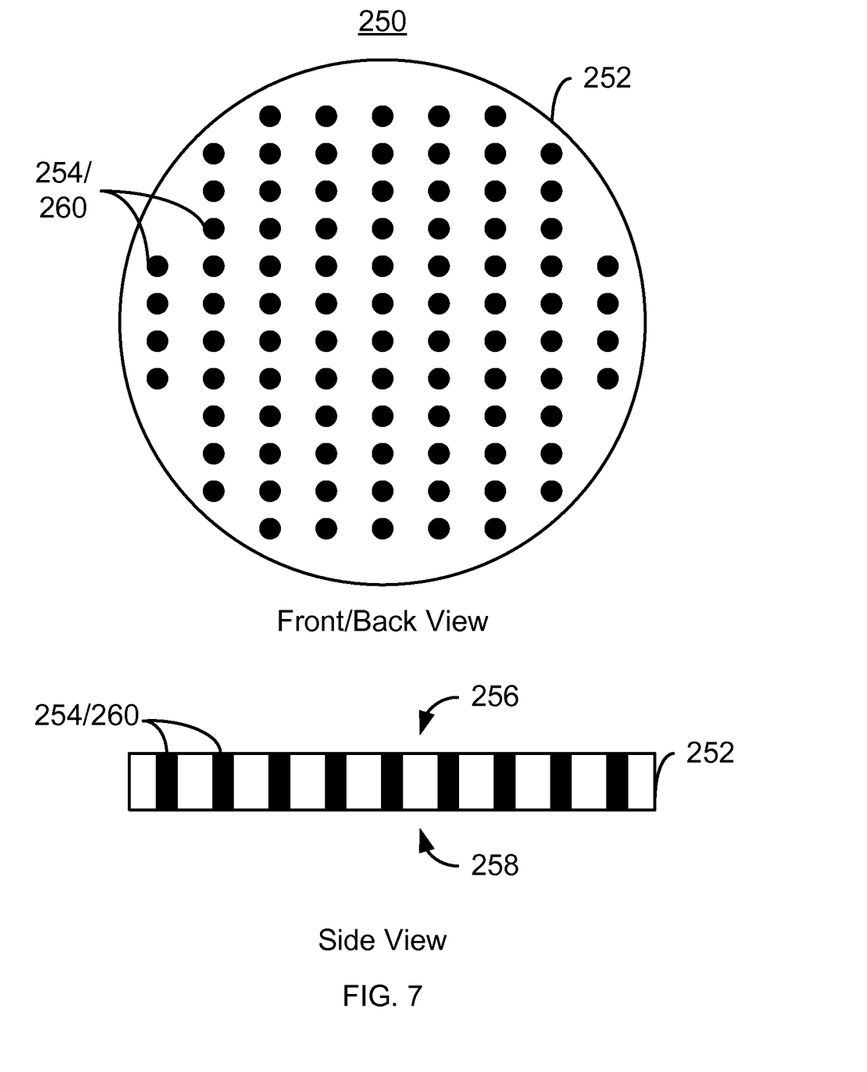

A transmission medium is provided in the apertures, via step 202. Step 202 is analogous to step 102. In some embodiments. In some embodiments, an index-matching material is used. However, in other embodiments, other transmission media such as waveguide compatible material, and a gas might be used. FIG. 7 depicts the substrate 252 after step 202 is performed. Thus, the apertures 254 are filled with the transmission media 260. Consequently, the apertures 254/transmission media 260 are shown in FIG. 7 as black.

Figure 8:
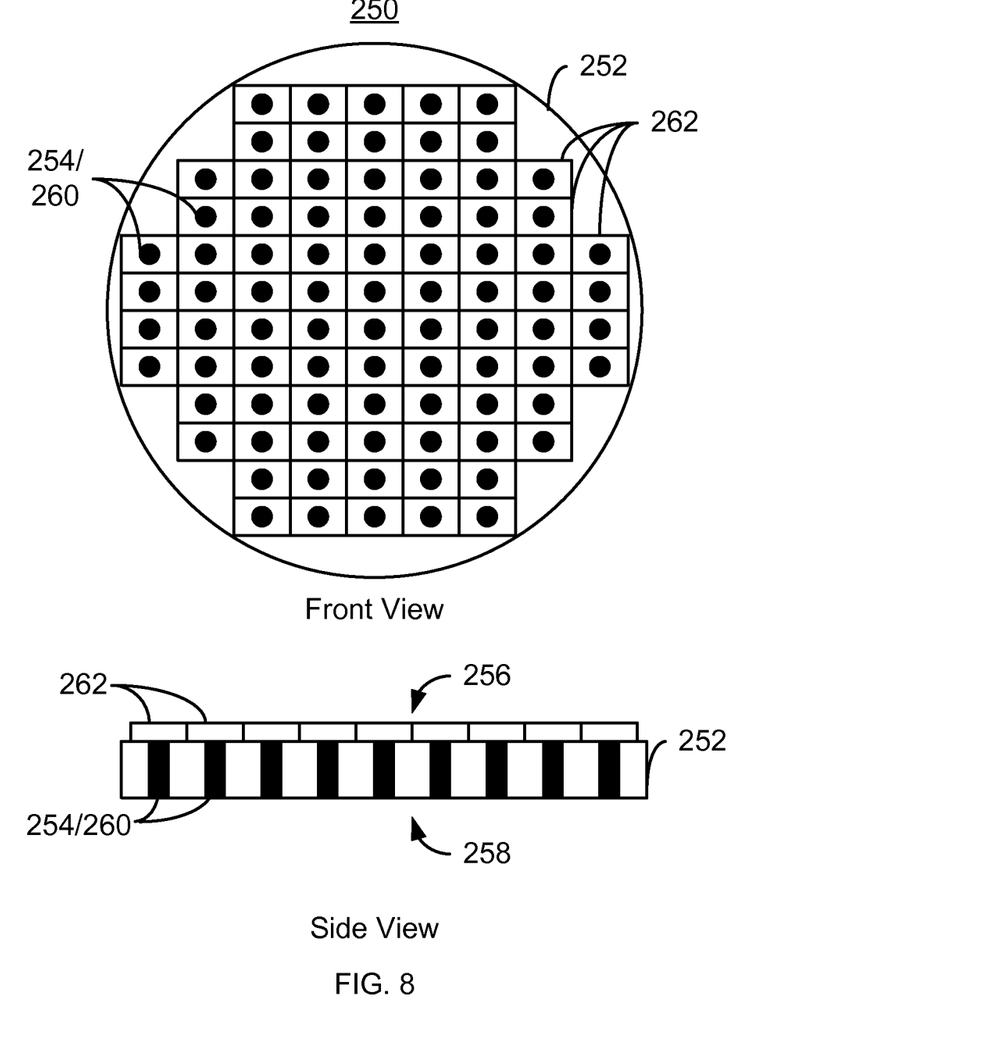

EAMR transducers are fabricated on the front side of the substrate, via step 204. Step 204 is analogous to step 104. Step 204 thus includes forming the EAMR transducers in locations corresponding to the plurality of apertures 254. The gratings, waveguides, NFTs, poles, coils, and other portions of the EAMR transducers may be formed in step 204. Fabricating a transducer includes providing an optical system, such as a parabolic mirror, to redirect light and a wave guide and corresponding to the plurality of apertures. FIG. 8 depicts the EAMR heads 250 after step 204 is performed. Thus, EAMR transducers 262 are also shown. For simplicity, no components of the transducers 262 are shown.

The back side of the substrate 252 may optionally be ground, via step 206. In addition, the substrate may optionally be polished in step 208. For example, in some embodiments, the substrate 252 starts off quite thick. For example, the substrate may be on the order of 1.235 millimeter thick. The substrate 252 may then be ground down, for example to less than one millimeter in thickness. In some such embodiments, the substrate 252 is 0.850 millimeter thick after grinding. However, in other embodiments, the thicknesses of the substrate 252 may differ.

Figure 9:
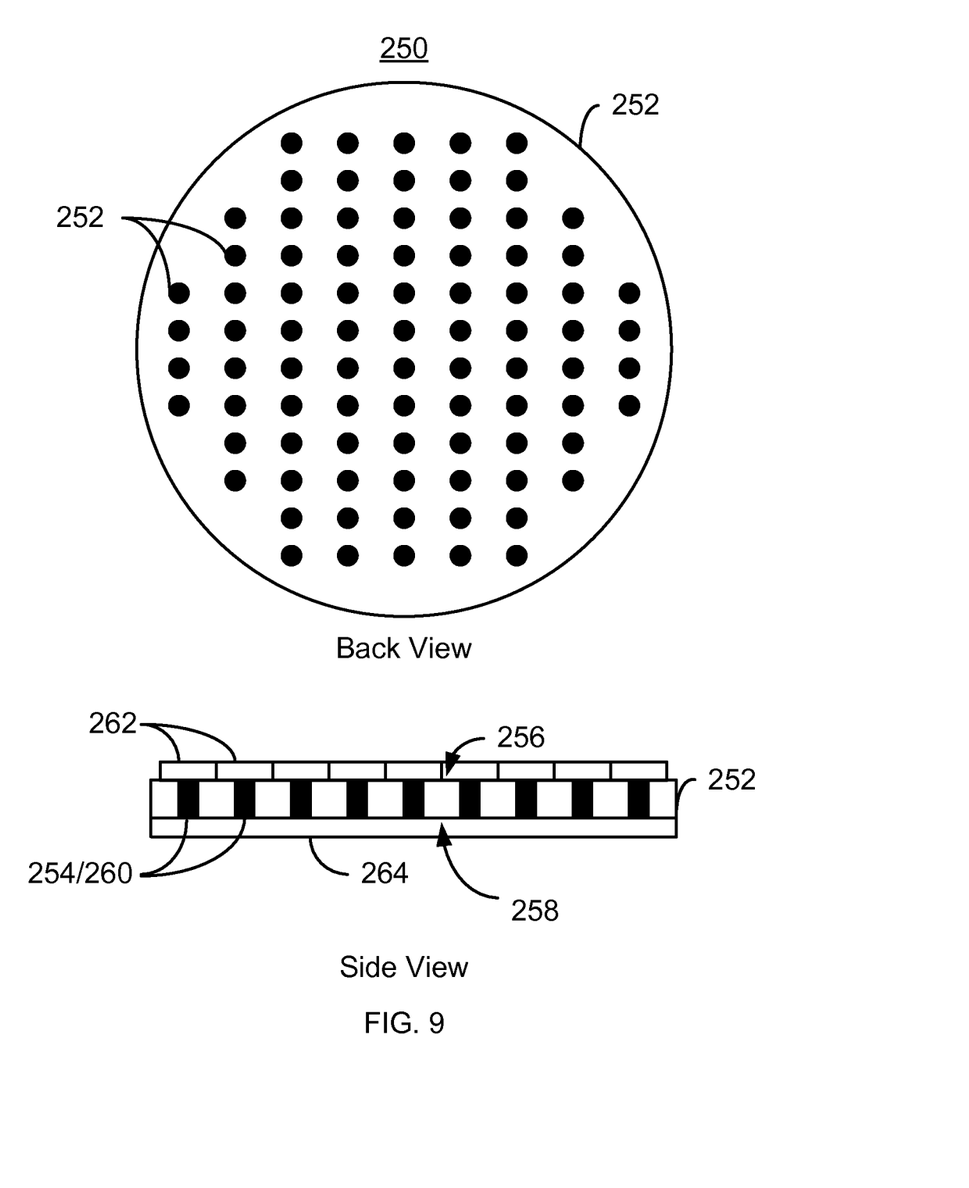

The back side of the substrate is electrically insulated, via step 210. In some embodiments, step 210 includes depositing an insulating layer on the back side of the substrate. For example, a layer of alumina may be deposited on the back side of the substrate. The thickness of the insulating layer is sufficient to provide electrical insulation. Thus, in some embodiments, the thickness is at least 0.1 micron to not more than one micron. In one such embodiment, the thickness is approximately 0.3 micron. FIG. 9 depicts the EAMR heads 250 after step 210 is performed. Thus, the thickness of the substrate 252 may be reduced by steps 206-208. In addition, insulating layer 264 has been deposited on the back side 258 of the substrate 252.

Figure 10:
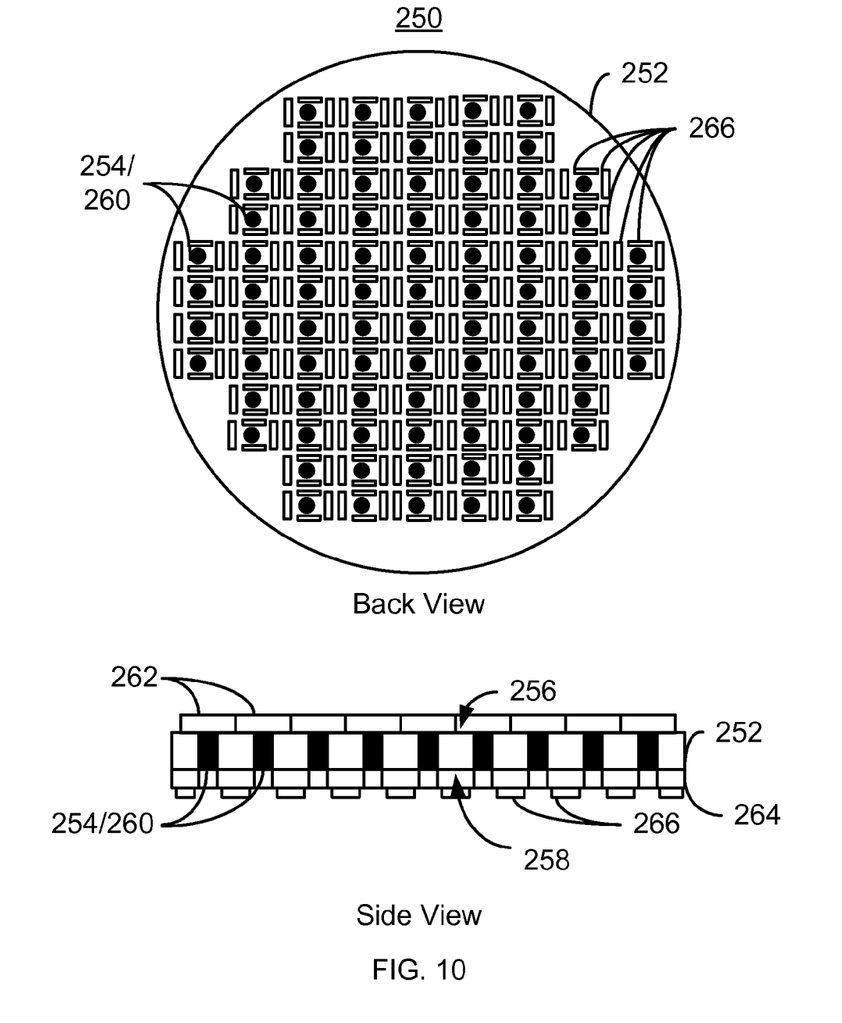

Electrical contacts and heat sinks for the lasers are provided on the back side 258 of the substrate, via step 212. Step 212 includes forming such features on the insulating layer 264. FIG. 10 depicts the EAMR heads 250 after step 212 is performed. Thus, contacts/heat sinks 266 formed are shown. The contacts/heat sinks 266 are formed on the back side 258, opposite to the EAMR transducers 262.

Figure 11:
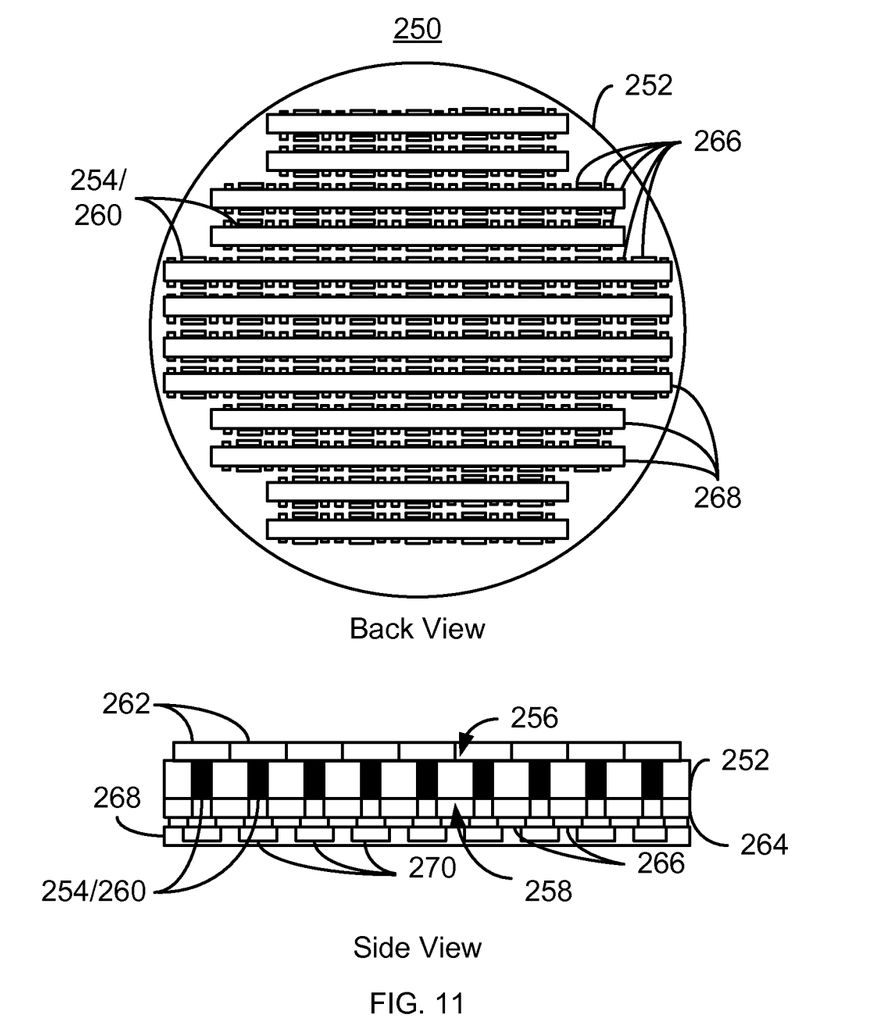

Laser diode bars are aligned to the contacts and heat sinks 266 and apertures 254, via step 214. In some embodiments, the laser diode bars are actively aligned, using the apertures 254. In other embodiments, the laser diode bars may be passively aligned or aligned via a combination of passive and active alignment. The lasers are electrically and mechanically coupled to the back of the substrate, via step 216. FIG. 11 depicts the EAMR heads 250 after step 216 has been performed. Thus, laser bars 268 have been provided. Each laser bar 268 includes a number of lasers 270. Thus, the lasers 270 corresponding to the EAMR heads are provided and configured to provide light through the apertures 254, to the optical system (not shown in FIGS. 6-11) that couples light from the aperture 254 the waveguide (not shown in FIGS. 6-11) of a corresponding EAMR transducer 262.

The substrate 252 is separated into the EAMR heads, via step 216. Thus, individual EAMR heads may be fabricated. Each of the heads 250 may be analogous to the head 150 depicted in FIG. 4. Once completed, the EAMR heads 250 may be coupled to a suspension or otherwise mounted in a disk drive.

Using the method 200, EAMR heads, such as the EAMR head 150, having transducers 262 on the front side 256/trailing edge and lasers 270 on the back side 258/leading edge may be fabricated. The method 200 and EAMR heads formed on the substrate 252 thus share the benefits of the method 100 and EAMR heads 150. Consequently, manufacturability and performance of the EAMR heads may be improved.

We claim:

1. An energy assisted magnetic recording (EAMR) head comprising:
    a slider including a leading edge and a trailing edge and an aperture therein, the aperture being a through hole between the leading edge and the trailing edge;
    a transmission medium residing in the aperture;
    at least one EAMR transducer residing on the trailing edge of the slider; and
    at least one laser residing on the leading edge and providing light to the EAMR transducer through the aperture.

2. The EAMR head of claim 1 wherein the transmission medium includes at least one of a waveguide-compatible material, an index-matching material and a gas.

3. The EAMR head of claim 2 wherein the transmission medium includes at least one of boron phosphate silicon glass, tantalum oxide, alumina, silica gel, Au, ambient air, and He.

4. The EAMR head of claim 1 wherein the at least one EAMR transducer includes a waveguide and an optical system configured to direct the light from the aperture to the waveguide.

5. The EAMR head of claim 1 wherein the apertures has a diameter of at least twelve microns and not more than five hundred microns.

6. The EAMR head of claim 1 wherein the aperture is at least forty-five microns and not more than one hundred microns.

* * * * *